US011184861B2

(12) United States Patent
Gao et al.

(10) Patent No.: US 11,184,861 B2
(45) Date of Patent: Nov. 23, 2021

(54) POWER CONTROL METHOD, APPARATUS AND SYSTEM FOR SHORT TRANSMISSION TIME INTERVAL TRANSMISSION AND STORAGE MEDIUM

(71) Applicant: CHINA ACADEMY OF TELECOMMUNICATIONS TECHNOLOGY, Beijing (CN)

(72) Inventors: Xuejuan Gao, Beijing (CN); Xueming Pan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/323,240

(22) PCT Filed: Aug. 3, 2017

(86) PCT No.: PCT/CN2017/095774
§ 371 (c)(1),
(2) Date: Feb. 4, 2019

(87) PCT Pub. No.: WO2018/024227
PCT Pub. Date: Feb. 8, 2018

(65) Prior Publication Data
US 2019/0174430 A1 Jun. 6, 2019

(30) Foreign Application Priority Data
Aug. 5, 2016 (CN) .......................... 201610634837.0

(51) Int. Cl.
*H04W 52/34* (2009.01)
*H04W 52/28* (2009.01)
(Continued)

(52) U.S. Cl.
CPC ......... *H04W 52/34* (2013.01); *H04W 52/146* (2013.01); *H04W 52/281* (2013.01);
(Continued)

(58) Field of Classification Search
CPC ... H04W 52/34; H04W 52/146; H04W 52/48; H04W 52/281; H04W 52/346; H04W 52/265; H04W 52/225
See application file for complete search history.

(56) References Cited

U.S. PATENT DOCUMENTS

2009/0125363 A1* 5/2009 Frederiksen ...... H04W 72/1263
370/345
2011/0141959 A1 6/2011 Damnjanovic et al.
(Continued)

FOREIGN PATENT DOCUMENTS

CN 102573030 A 7/2012
CN 102740407 A 10/2012
(Continued)

OTHER PUBLICATIONS

International Search Report issued for PCT/CN2017/095774 dated Oct. 20, 2017 and its English translation provided by WIPO.
(Continued)

*Primary Examiner* — Dong-Chang Shiue
(74) *Attorney, Agent, or Firm* — Ladas & Parry, LLP

(57) ABSTRACT

A power control method, apparatus and system for short transmission time interval transmission, and a storage medium are provided, relating to the field of communication, so as to avoid introducing a new transient period definition with respect to the transmission with a short TTI, and ensure the power measurement to be completed according to the time template defined in the existing 3GPP 36.101 protocol. The present disclosure includes: determining a first target transmission power corresponding to a to-be-pro-
(Continued)

cessed object in a subframe, in a case that the subframe includes a plurality of short transmission time interval TTI transmissions; and transmitting the short TTI transmission within the to-be-processed object according to the first target transmission power corresponding to the to-be-processed object.

18 Claims, 9 Drawing Sheets

(51) Int. Cl.
    *H04W 52/14*     (2009.01)
    *H04W 52/48*     (2009.01)
    *H04W 52/22*     (2009.01)
    *H04W 52/26*     (2009.01)

(52) U.S. Cl.
    CPC .......... *H04W 52/48* (2013.01); *H04W 52/225* (2013.01); *H04W 52/265* (2013.01); *H04W 52/346* (2013.01)

(56) References Cited

U.S. PATENT DOCUMENTS

| | | | |
|---|---|---|---|
| 2011/0287804 A1 | 11/2011 | Seo et al. | |
| 2013/0077571 A1* | 3/2013 | Papasakellariou | H04W 74/004 370/328 |
| 2014/0071954 A1 | 3/2014 | Au et al. | |
| 2014/0329555 A1 | 11/2014 | Gao et al. | |
| 2015/0188650 A1 | 7/2015 | Au et al. | |
| 2016/0205631 A1 | 7/2016 | Chen et al. | |
| 2017/0013565 A1* | 1/2017 | Pelletier | H04W 52/365 |
| 2017/0290004 A1* | 10/2017 | Yang | H04W 72/0446 |
| 2018/0176938 A1* | 6/2018 | Shao | H04W 52/346 |
| 2019/0159138 A1* | 5/2019 | Lee | H04W 52/146 |

FOREIGN PATENT DOCUMENTS

| | | |
|---|---|---|
| WO | 2015116866 A1 | 8/2015 |
| WO | 2016040290 A1 | 3/2016 |

OTHER PUBLICATIONS

Written Opinion of the International Search Authority issued for PCT/CN2017/095774 dated Oct. 20, 2017 and its English translation provided by WIPO.
International Preliminary Report on Patentability issued for PCT/CN2017/095774 dated Oct. 20, 2017 and its English translation provided by WIPO.
Nokia et al., "Uplink power control", 3GPP TSG-RAN WG1 #85, R1-165380, May 23-27, 2016, pp. 1-3.
Zte et al., "Way Forward on sPDCCH transmitted in sTTI and legacy PDCCH region," 3GPP TSG RAN WG1 Meeting #85, R1-165548, May 23-27, 2016, pp. 1-3.
Nokia et al., "Way forward on scheduling mechanism for sTTI," 3GPP RAN WG 1 #85, R1-165571, pp. 1-3.
Office Action issued for Chinese Application No. 201610634837.0 dated Dec. 14, 2018.
Nokia et al., "On design of DL control channel for shorter TTI operation," 3GPP TSG-RAN WG1 Meeting #84bis, R1-163267, March 11-15, 2-16, pp. 1-5.
Panasonic, "Discussion on reference signal design for shortened TTI," 3 GPP TSG RAN WG1 Meeting #85, R1-164909, May 23-27, 2016, pp. 1-3.
Extended European Search Report from EP app. No. 17836409.7, dated Jun. 14, 2019.
"Channel design for shortened TTI in FDD" R 1-162945, 3GPP TSG RAN WG1 Meeting #84bis, Busan, Korea, Apr. 11-15, 2016.
Communication pursuant to Article 94(3) EPC from EP app. No. 17836409.7, dated Jan. 22, 2021.

* cited by examiner

POWER CONTROL METHOD, APPARATUS AND SYSTEM FOR SHORT TRANSMISSION TIME INTERVAL TRANSMISSION AND STORAGE MEDIUM

CROSS-REFERENCE TO RELATED APPLICATIONS

This application is the U.S. national phase of PCT Application No. PCT/CN2017/095774 filed on Aug. 3, 2017, which claims priority to Chinese Patent Application No. 201610634837.0 filed on Aug. 5, 2016, the disclosures of which are incorporated in their entireties by reference herein.

TECHNICAL FIELD

The present disclosure relates to the technical field of communications, in particular to a power control method, apparatus and system for a short transmission time interval transmission, and a storage medium.

BACKGROUND

With the development and change of mobile communication service requirements, several organizations such as the International Telecommunication Union (ITU) have defined a higher user-plane delay performance requirement for a future mobile communication system. One of the main methods for shortening user delay and improving performance is to reduce a time duration of the transmission time interval (TTI).

A radio frame structure type 1 (abbreviated as FS1) is applicable to an existing LTE (Long Term Evolution) FDD (Frequency Division Duplex) system, and a structure of FS1 is as shown in FIG. 1. In the FDD system, different carrier frequencies are used for an uplink transmission and a downlink transmission, and a same frame structure is used for the uplink transmission and the downlink transmission. For each carrier, a radio frame with a length of 10 ms contains ten subframes with a length of 1 ms, and each of the subframes is further segmented into two slots with a duration of 0.5 ms. A TTI duration of transmitting uplink and downlink data is 1 ms.

A radio frame structure type 2 (abbreviated as FS2) as shown in FIG. 2 is applicable to an existing LTE TDD (Time Division Duplex) system. In the TDD system, different subframes or different slots on one frequency are used for the uplink and downlink transmission. Each radio frame with a length of 10 ms in the FS2 consists of two half-frames with a duration of 5 ms, and each of the half-frames contains five subframes of a 1 ms length. The subframes in the FS2 are classified into three types: downlink subframes, uplink subframes, and special subframes. Each special subframe consists of three fields, which are a downlink pilot slot (DwPTS), a guard period (GP), and an uplink pilot slot (UpPTS). Each half-frame contains at least one downlink subframe, at least one uplink subframe, and at most one special subframe.

A typical operating mode for a short TTI transmission is to include multiple short TTI transmissions having a duration of shorter than 1 ms in the subframe structure defined by the existing LTE mechanism. The uplink supports a shortened physical uplink shared channel (sPUSCH) and a shortened physical uplink control channel (sPUCCH). The length of the short TTI may be two, three, four, or seven OFDM (Orthogonal Frequency Division Multiplexing) or SC-FDMA (Single-carrier Frequency-Division Multiple Access) symbols. Of course, some cases where the number of symbols does not exceed 14 or a duration of the time domain does not exceed 1 ms are not excluded by the short TTI. One subframe may include multiple sPUSCH transmissions, multiple sPUCCH transmissions, or multiple sPUSCH and sPUCCH transmissions.

In the Rel-13 and the previous 3GPP 36.101 protocol, a time template is defined, which is used to measure a stable output power or the like. A transient period is a transition adjustment period made by a terminal apparatus according to power change and resource change, and the power is unstable during this period, which is excluded by the measurement content.

In the LTE system, channel transmission is defined in a unit of a subframe. When the sPUSCH transmission and sPUCCH transmission are introduced, multiple sPUCCH/sPUSCH transmissions may exist in one subframe in a Time Division Multiplexing (TDM) manner in a time domain. Since powers of the sPUCCH/sPUSCH transmissions may be different, and a definition of the transient period is required to be added between the short TTI transmissions for power adjustment, which causes the TTI transmission unable to be performed according to the time template defined in the existing 3GPP 36.101 protocol.

SUMMARY

In view of the above, a power control method and a power control apparatus for a short transmission time interval (TTI) transmission are provided according to the present disclosure, so as to avoid introducing a new transient period definition to the short TTI transmission, and ensure power measurement to be performed according to a time template defined in the existing 3GPP 36.101 protocol.

In order to address the above issue, in a first aspect, a power control method for a short transmission time interval transmission is provided according to the present disclosure. The method includes:

determining a first target transmission power corresponding to a to-be-processed object in a subframe, in a case that the subframe includes a plurality of short transmission time interval (TTI) transmissions; and transmitting a plurality of short TTI transmissions within the to-be-processed object according to the first target transmission power corresponding to the to-be-processed object.

The determining the first target transmission power corresponding to the to-be-processed object in the subframe includes:

determining a target transmission power of a first one of the short TTI transmissions within the to-be-processed object; and determining the target transmission power of the first short TTI transmission within the to-be-processed object as the first target transmission power corresponding to the to-be-processed object.

The determining the first target transmission power corresponding to the to-be-processed object in the subframe includes:

determining target transmission powers of all the short TTI transmissions within the to-be-processed object; and determining a maximum value, a minimum value, or an average value of the target transmission powers of all the short TTI transmissions within the to-be-processed object as the first target transmission power corresponding to the to-be-processed object.

The determining the first target transmission power corresponding to the to-be-processed object in the subframe includes:

determining the first target transmitting power corresponding to the to-be-processed object according to a power allocation priority of each of the short TTI transmissions within the to-be-processed object.

The power allocation priority includes any one or combination of a channel priority, an uplink control information (UCI) type priority, and a service type priority.

The determining the first target transmission power corresponding to the to-be-processed object according to the power allocation priority of each of the short TTI transmissions within the to-be-processed object includes:

taking a target transmission power of the short TTI transmission having the highest or lowest power allocation priority within the to-be-processed object as the first target transmission power corresponding to the to-be-processed object.

In a case that there is a plurality of short TTI transmissions having a same power allocation priority, the taking the target transmission power of the short TTI transmission having the highest or lowest power allocation priority within the to-be-processed object as the first target transmission power corresponding to the to-be-processed object includes:

taking the maximum one of the target transmission powers of the short TTI transmissions having the highest or lowest power allocation priority as the first target transmission power corresponding to the to-be-processed object.

In a case that the power allocation priority is the channel priority, the method further includes:

defining a priority of a shortened physical uplink shared channel (sPUSCH) to be higher than a priority of a shortened physical uplink control channel (sPUCCH); or defining the priority of the sPUCCH to be higher than the priority of the sPUSCH; or defining a priority of a channel with a wide bandwidth to be higher than a priority of a channel with a narrow bandwidth.

In a case that the power allocation priority is the UCI type priority, the method further includes:

defining a priority of a channel with UCI to be higher than a priority of a without the UCI channel without the UCI; where among the channels with the UCI, a priority of a channel with an uplink scheduling request (SR) and/or an acknowledgment/negative acknowledgment (ACK/NACK) is higher than a priority of a channel with periodic channel state information (CSI).

In a case that the power allocation priority is the service type priority, the method further includes:

defining a high priority for a service type with a high quality of service (Qos) or a service type with a critical delay requirement.

In a case that the power allocation priority is a combination of the channel priority and the UCI type priority, the method further includes:

defining that a priority of an sPUSCH with the UCI is higher than a priority of an sPUCCH, and that the priority of the sPUCCH is higher than a priority of an sPUSCH without the UCI; and defining that a priority of an sPUSCH with SR and/or ACK/NACK is higher than a priority of an sPUSCH with periodic CSI, and that a priority of an sPUCCH with the SR and/or the ACK/NACK is higher than a priority of an sPUCCH with the periodic CSI; or defining that the priority of the sPUSCH with the UCI is higher than the priority of the sPUSCH without the UCI, and that the priority of the sPUSCH without the UCI is higher than the priority of the sPUCCH; and defining that the priority of the sPUSCH with the SR and/or the ACK/NACK is higher than the priority of the sPUSCH with the periodic CSI, and that the priority of the sPUCCH with the SR and/or the ACK/NACK is higher than the priority of the sPUCCH with the periodic CSI.

The target transmitting power is determined according to a power control parameter corresponding to the corresponding short TTI transmission.

If a plurality of short TTI transmissions overlap or partially overlap with each other in a time domain, the target transmission power is obtained by adjusting the target transmission powers of the plurality of short TTI transmissions overlapping with each other in the time domain based on a maximum transmission power of a terminal; or if a plurality of short TTI transmissions are transmitted in a frequency division multiplexing manner on a same carrier or on different carriers in a frequency domain, the target transmission power is a target transmission power of one of the short TTI transmissions selected according to at least one of the channel priority or the service type priority.

The transmitting the plurality of short TTI transmissions within the to-be-processed object according to the first target transmission power corresponding to the to-be-processed object includes:

transmitting all of the short TTI transmissions within the to-be-processed object directly according to the first target transmission power.

The transmitting the plurality of short TTI transmissions within the to-be-processed object according to the first target transmitting power corresponding to the to-be-processed object includes:

determining a target transmitting power of each of the short TTI transmissions within the to-be-processed object;

comparing the target transmitting power of each of the short TTI transmissions with the first target transmitting power;

adjusting a target transmission power of a first short TTI transmission to be equal to the first target transmission power, if the target transmission power of the first short TTI transmission is different from the first target transmission power, where the first short TTI transmission is any one of the short TTI transmissions; and transmitting the first short TTI transmission according to the adjusted target transmission power of the first short TTI transmission.

The adjusting the target transmitting power of the first short TTI transmission includes:

if the target transmission power of the first short TTI transmission is lower than the first target transmission power, raising the target transmission power of the first short TTI transmission to be equal to the first target transmission power; or if the target transmission power of the first short TTI transmission is higher than the first target transmission power, reducing the target transmission power of the first short TTI transmission to be equal to the first target transmission power.

The to-be-processed object in the subframe is the subframe.

The to-be-processed object in the subframe is any one of periods in the subframe; and before determining the first target transmission power corresponding to the to-be-processed object in a subframe, the method further includes:

determining whether the plurality of short TTI transmissions included in the subframe is continuous in time; and if there are short TTI transmissions that are discontinuous in time in the subframe, segmenting the subframe into at least two periods, where each of the periods includes one or more short TTI transmissions, and when the period includes more than one short TTI transmissions, the more than one short TTI transmissions included in the period are continuous in time.

Before the determining the first target transmitting power corresponding to the to-be-processed object, the method further includes: receiving configuration information for indicating a power adjustment mode. The determining the first target transmitting power corresponding to the to-be-processed object specifically includes: determining the first target transmitting power corresponding to the to-be-processed object according to the configuration information for indicating a power adjustment mode.

The short TTI transmission includes one of an sPUSCH, an sPUCCH and a sounding reference signal (SRS), or any combination thereof.

In a second aspect, a power control apparatus for short transmission time interval transmission is further provided according to the present disclosure, which includes:

a determining module, configured to determine a first target transmission power corresponding to a to-be-processed object in a subframe, in a case that the subframe includes a plurality of short TTI transmissions; and a transmitting module, configured to transmit a plurality of short TTI transmissions within the to-be-processed object according to the first target transmission power corresponding to the to-be-processed object.

The determining module includes:

a first determining sub-module, configured to determine a target transmission power of a first one of the short TTI transmissions within the to-be-processed object; and a second determining sub-module, configured to determine the target transmission power of the first short TTI transmission within the to-be-processed object as the first target transmission power corresponding to the to-be-processed object.

The determining module includes:

a third determining sub-module, configured to determine target transmission powers of all the short TTI transmissions within the to-be-processed object; and a fourth determining sub-module, configured to determine a maximum value, a minimum value, or an average value of the target transmission powers of all the short TTI transmissions within the to-be-processed object as the first target transmission power corresponding to the to-be-processed object.

The determining module is specifically configured to:

determine the first target transmission power corresponding to the to-be-processed object according to a power allocation priority of each of the short TTI transmissions within the to-be-processed object.

The power allocation priority includes any one or combination of a channel priority, an uplink control information UCI type priority, and a service type priority.

The determining module is specifically configured to:

take a target transmission power of the short TTI transmission having the highest or lowest power allocation priority within the to-be-processed object as the first target transmission power corresponding to the to-be-processed object.

In a case that there is a plurality of short TTI transmissions having a same power allocation priority, the determining module is specifically configured to: take the maximum one of the target transmission powers of the short TTI transmissions having the highest or lowest power allocation priority as the first target transmission power corresponding to the to-be-processed object.

In a case that the power allocation priority is the channel priority, a priority of a shortened physical uplink shared channel (sPUSCH) is higher than a priority of a shortened physical uplink control channel (sPUCCH); or the priority of the sPUCCH is higher than the priority of the sPUSCH; or a priority of a channel with a wide bandwidth is higher than a priority of a channel with a narrow bandwidth.

In a case that the power allocation priority is the UCI type priority, a priority of a channel with UCI is higher than a priority of a channel without UCI; and among the channels with the UCI, a priority of a channel with an uplink scheduling request (SR) and/or an acknowledgment/negative acknowledgment (ACK/NACK) is higher than a priority of a channel with periodic channel state information (CSI).

In a case that the power allocation priority is the service type priority, a service type with a high quality of service (Qos) or a service type with a high delay requirement has a high priority.

In a case that the power allocation priority is the combination of the channel priority and the UCI type priority, a priority of an sPUSCH with the UCI is higher than a priority of an sPUSCH, and the priority of the sPUCCH is higher than a priority of an sPUSCH without the UCI; and a priority of an sPUSCH with SR and/or ACK/NACK is higher than a priority of an sPUSCH with periodic CSI, and a priority of an sPUCCH with the SR and/or the ACK/NACK is higher than a priority of an sPUCCH with the periodic CSI; or the priority of the sPUSCH with the UCI is higher than the priority of the sPUSCH without the UCI, and the priority of the sPUSCH without the UCI is higher than the priority of the sPUCCH; and the priority of the sPUSCH with the SR and/or the ACK/NACK is higher than the priority of the sPUSCH with the periodic CSI, and the priority of the sPUCCH with the SR and/or the ACK/NACK is higher than the priority of the sPUCCH with the periodic CSI.

The target transmitting power is determined according to a power control parameter corresponding to the corresponding short TTI transmission.

If a plurality of short TTI transmissions overlap or partially overlap with each other in a time domain, the target transmission power is obtained by adjusting the target transmission powers of the plurality of short TTI transmissions overlapping in the time domain based on the maximum transmission power of a terminal; or, if a plurality of short TTI transmissions are transmitted in a frequency division multiplexing manner on a same carrier or on different carriers in a frequency domain, the target transmission power is a target transmission power of one of the short TTI transmissions selected according to at least one of the channel priority or the service type priority.

The transmitting module is specifically configured to transmit all of the short TTI transmissions within the to-be-processed object directly according to the first target transmission power.

The transmitting module includes:

a fifth determining sub-module, configured to determine a target transmission power of each of the short TTI transmissions within the to-be-processed object;

a comparing sub-module, configured to compare the target transmission power of each of the short TTI transmissions with the first target transmission power;

an adjusting sub-module, configured to adjust a target transmission power of a first short TTI transmission to be equal to the first target transmission power, if a target transmission power of the first short TTI transmission is different from the first target transmission power, where the first short TTI transmissions is any one of the short TTI transmissions; and a transmitting sub-module, configured to transmit the first short TTI transmission according to the adjusted target transmission power of the first short TTI transmission.

The adjusting sub-module is specifically configured to:

if a target transmission power of the first short TTI transmission is lower than the first target transmission power, raise the target transmission power of the first short TTI transmission to be equal to the first target transmission power; or if a target transmission power of the first short TTI transmission is higher than the first target transmission power, reduce the target transmission power of the first short TTI transmission to be equal to the first target transmission power.

The to-be-processed object in the subframe is the subframe.

The to-be-processed object in the subframe is any one of periods in the subframe; and before determining the first target transmission power corresponding to the to-be-processed object in a subframe, the apparatus further includes:

a judging module, configured to judge whether the plurality of short TTI transmissions included in the subframe is continuous in time; and a segmenting module, configured to, if there are short TTI transmissions that are discontinuous in time in the subframe, segment the subframe into at least two periods, where each of the periods includes one or more short TTI transmissions, and when the period includes more than one short TTI transmissions, the more than one short TTI transmissions included in the period are continuous in time.

The apparatus further includes a receiving module, configured to receive configuration information for indicating a power adjustment mode. The determining module is specifically configured to: determine the first target transmission power corresponding to the to-be-processed object according to the configuration information for indicating the power adjustment mode.

Each of the short TTI transmissions includes any one or any combination of: an sPUSCH, an sPUCCH, and a sounding reference signal (SRS).

In a third aspect, a power control system for short transmission time interval transmission is further provided according to the present disclosure, which includes:

a processor; and a transceiver, configured to receive and transmit data under control of the processor, where the processor is configured to perform operations as follows:

determining a first target transmission power corresponding to a to-be-processed object in a subframe, in a case that the subframe includes a plurality of short transmission time interval (TTI) transmissions; and transmitting a plurality of short TTI transmissions within the to-be-processed object according to the first target transmission power corresponding to the to-be-processed object.

In a fourth aspect, a non-volatile computer readable storage medium is further provided according to the present disclosure, computer readable instructions executable by a processor is stored in the computer readable storage medium, and when the computer readable instructions are executed by the processor, where the processor is configured to perform operations as follows:

determining a first target transmission power corresponding to a to-be-processed object in a subframe, in a case that the subframe includes a plurality of short transmission time interval (TTI) transmissions; and transmitting a plurality of short TTI transmissions within the to-be-processed object according to the first target transmission power corresponding to the to-be-processed object.

The above-described technical solutions of the present disclosure have beneficial effects as follows.

In the embodiments of the present disclosure, the power control is performed on the short TTI transmission corresponding to the to-be-processed object in the subframe, so as to ensure that the powers for the short TTI transmissions within the to-be-processed object transmitted in the TDM manner are the same, thereby ensuring the transmitting power of the terminal within the to-be-processed object to be kept constant, thereby avoiding the introduction of a new transient period between short TTI transmissions. Hence, with the solutions according to the embodiments of the present disclosure, the power measurement may be completed according to the time template defined in the existing 3GPP 36.101 protocol.

DETAILED DESCRIPTION

Hereinafter, particular embodiments of the present disclosure are described in detail in conjunction with the drawings and embodiments. The following embodiments are used to illustrate the present disclosure, but not intended to limit the scope of the present disclosure.

In the embodiments of the present disclosure, in order to ensure that the power measurement is completed according to the time template defined in the existing 3GPP 36.101 protocol in a case that one subframe includes a plurality of short TTI transmissions, the power control is performed on each of the short TTI transmissions to ensure that transmitting powers of the short TTI transmissions are the same.

Figure 1:
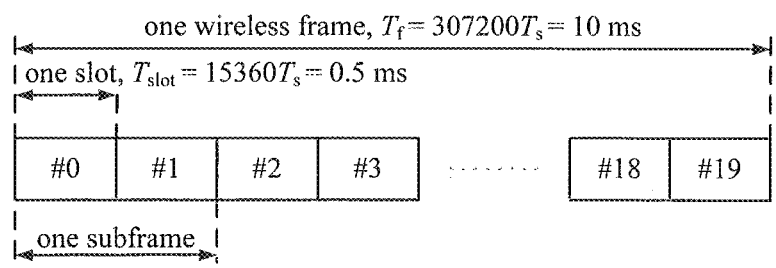
FIG. 1 is a schematic diagram of a frame structure in the related art.
Figure 2:
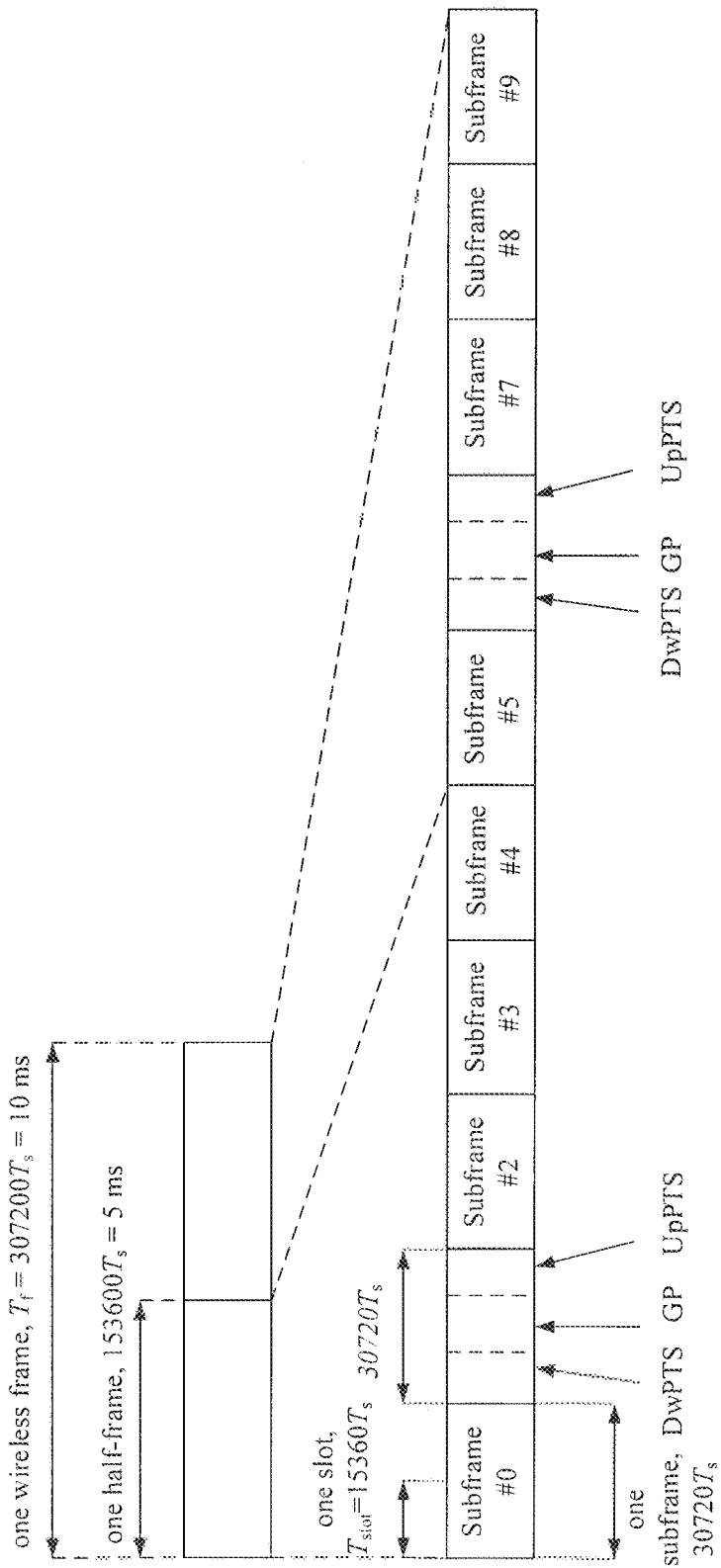
FIG. 2 is a schematic diagram of another frame structure in the related art.
Figure 3:
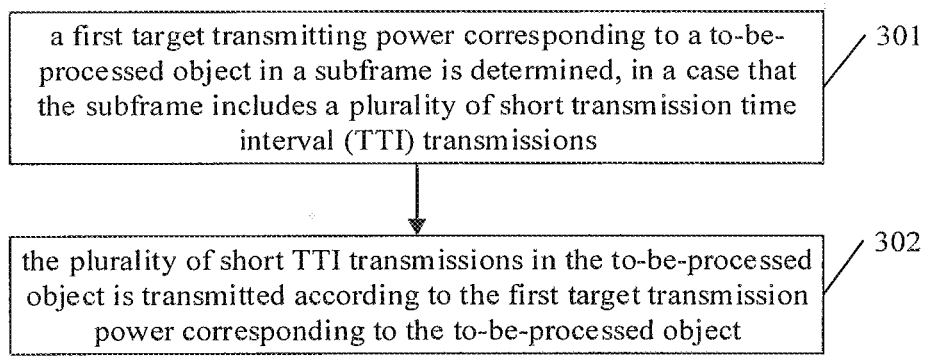
FIG. 3 is a flowchart of a power control method for a short transmission time interval transmission according to an embodiment of the present disclosure.

As shown in FIG. 3, a power control method for a short transmission time interval transmission is provided according to an embodiment of the present disclosure, which is applied to a terminal. The method includes the following steps 301 to 302.

In step 301, a first target transmitting power corresponding to a to-be-processed object in a subframe is determined, in a case that the subframe includes a plurality of short transmission time interval (TTI) transmissions.

In the embodiments of the present disclosure, the to-be-processed object in the subframe may refer to the subframe, or may also refer to any periods included in the subframe. The periods are obtained by segmenting the subframe according to whether the plurality of short TTI transmissions is continuous in time. One or more of short TTI transmissions are included in each period. If a certain period includes more than one of short TTI transmissions, the more than one of short TTI transmissions included in the period are continuous in time.

The short TTI transmission includes: an sPUSCH, and/or an sPUCCH, and/or an SRS (sounding reference signal).

There may be different methods for determining the first target transmitting power.

In a first method, the following manners may be used for determining the first target transmitting power by taking the to-be-processed object being a subframe as an example in the embodiments of the present disclosure.

In a first manner, a target transmitting power of a first short TTI transmission in the subframe is determined, and the target transmitting power of the first short TTI transmission in the subframe is determined as the first target transmitting power corresponding to the subframe.

In the embodiment of the present disclosure, a target transmission power of any one of the short TTI transmissions is a transmission power determined according to a power control parameter corresponding to the short TTI transmission.

For example, in this step, in determining the target transmission power of the first short TTI transmission in the subframe, the power control parameter of the first short TTI transmission may be acquired, and the target transmission power of the first short TTI transmission is determined according to the power control parameter.

In a second manner, target transmission powers of all the short TTI transmissions in the subframe is determined, and a maximum value, a minimum value or an average value of the target transmission powers of all the short TTI transmissions in the subframe is determined as the first target transmission power corresponding to the subframe.

In this step, in determining the target transmission powers of all the short TTI transmissions in the subframe, a power control parameter for each of the short TTI transmissions in the subframe is acquired, and the target transmission power of each of the short TTI transmissions is determined according to the power control parameter of the short TTI transmission.

In a third manner, the first target transmission power corresponding to the subframe is determined according to a power allocation priority of each of the short TTI transmissions in the subframe.

The power allocation priority includes any one or any combination of the following priorities: channel priority, UCI (uplink control information) type priority, and service type priority.

In the third manner, the target transmission power of the short TTI transmission with the highest or lowest power allocation priority in the subframe is used as the first target transmission power corresponding to the to-be-processed object. Similarly, in this manner, the short TTI transmission with the highest or lowest power allocation priority may be first determined, then a power control parameter for the short TTI transmission is acquired, and the corresponding target transmission power is determined according to the power control parameter.

Specifically, in a case that the power allocation priority is the channel priority, a definition may be made as follows:

defining a priority of a shortened physical uplink shared channel (sPUSCH) to be higher than a priority of a shortened physical uplink control channel (sPUCCH); or defining the priority of the sPUCCH to be higher than the priority of the sPUSCH; or defining a priority of a channel with a wide bandwidth to be higher than a priority of a channel with a narrow bandwidth.

Specifically, in a case that the power allocation priority is the UCI type priority, a definition may be made as follows:

defining a priority of a channel with UCI to be higher than a priority of a without the UCI channel without the UCI; where among the channels with the UCI, a priority of a channel with an uplink scheduling request (SR) and/or a positive acknowledgment/negative acknowledgment (ACK/NACK) is higher than a priority of a channel with periodic channel state information (CSI).

In a case that the power allocation priority is the service type priority, a definition may be made as follows:

defining a high priority for a service type with a high quality of service (Qos) or a service type with a high delay requirement.

Optionally, any combination of the above-described priorities is also applicable. For example, in a case that the power allocation priority is a combination of the channel priority and the UCI type priority, a definition may be made as follows:

defining that a priority of an sPUSCH with the UCI is higher than a priority of an sPUCCH, and that the priority of the sPUCCH is higher than a priority of an sPUSCH without the UCI; and defining that a priority of an sPUSCH with SR and/or ACK/NACK is higher than a priority of an sPUSCH with periodic CSI, and that a priority of an sPUCCH with the SR and/or the ACK/NACK is higher than a priority of an sPUCCH with the periodic CSI; or defining that the priority of the sPUSCH with the UCI is higher than the priority of the sPUSCH without the UCI, and that the priority of the sPUSCH without the UCI is higher than the priority of the sPUCCH; and defining that the priority of the sPUSCH with the SR and/or the ACK/NACK is higher than the priority of the sPUSCH with the periodic CSI, and that the priority of the sPUCCH with the SR and/or the ACK/NACK is higher than the priority of the sPUCCH with the periodic CSI.

Other combinations of the above-described priorities are similar as the above combination.

In the process of determining the target transmission power as described above, if at least one of the short TTI transmissions overlap or partially overlap with each other in a time domain, the target transmission power is a target transmission power obtained by adjusting target transmission powers of the at least one short TTI transmissions overlapping in the time domain based on the maximum transmission power of a terminal; or, if at least one of the short TTI transmissions are transmitted in a frequency division multiplexing manner on a same carrier or on different carriers in the frequency domain, the determined target transmission power is a target transmission power of one of the short TTI transmissions selected according to at least one of the channel priority or the service type priority.

In a second method, one or more periods included in the subframe are taken as the to-be-processed objects, and a first target transmission power corresponding to the short TTI transmission in each of the periods a determined.

Then, processing may be performed according to pre-segmented periods or the periods obtained by segmenting the subframe when the method according to the embodiment of the present disclosure is performed. In segmenting the periods, it may be first determined whether the plurality of short TTI transmissions included in the subframe is continuous in time. If some or all of the short TTI transmissions that are discontinuous in time exist in the subframe, the subframe is segmented into at least two periods. Each of the periods includes one or more short TTI transmissions, and when the period includes more than one short TTI transmissions, the more than one short TTI transmissions included in the period are continuous in time.

For a certain period in the subframe, if more than two short TTI transmissions are included in the period, for a manner of determining the first target transmission power corresponding to the period, reference may be made to the manners of determining the first target transmission power in the first method as described above, as long as the to-be-processed object "subframe" in the above-described manners is replaced with the "period". The powers of short TTI transmissions in different periods may be determined independently, and may be different. If a period contains only one short TTI transmission, the target transmission power of the short TTI transmission may be directly determined according to the power control parameter of the short TTI transmission, and the target transmission power is used as the actual transmission power of the short TTI transmission, namely, the first target transmission power.

It should be noted that the second method further includes a step of making a judgment in advance on the basis of the first method. If the foregoing segmentation is required to be performed, for example, a plurality of short TTI transmissions that are discontinuous in time exist in a subframe, the segmentation is first performed. If the foregoing segmentation is not required, for example, a plurality of short TTI transmissions in a subframe are continuous in time, the first method is directly used for determining.

In step 302, the plurality of short TTI transmissions within the to-be-processed object is transmitted according to the first target transmission power corresponding to the to-be-processed object.

In this step, the following manners may be used for transmitting the short TTI transmission.

In a first manner, the short TTI transmissions may be directly transmitted according to the first target transmission power. That is, in this manner, all of the short TTI transmissions in the subframe are transmitted according to the first target transmission power.

In a second manner, a target transmission power of each of the short TTI transmissions within the to-be-processed object is determined, and the target transmission power of each of the short TTI transmissions is compared with the first target transmission power.

If a target transmission power of a first short TTI transmission of the short TTI transmissions is different from the first target transmission power, the target transmission power of the first short TTI transmission is adjusted such that the adjusted target transmission power of the first short TTI transmission is equal to the first target transmission power, and the first short TTI transmission is transmitted according to the adjusted target transmission power of the first short TTI transmission. The first short TTI transmission refers to any one of the short TTI transmissions in the subframe or in the period.

In adjusting the power, if the target transmission power of the first short TTI transmission is lower than the first target transmission power, the target transmission power of the first short TTI transmission is raised such that the raised target transmission power of the first short TTI transmission is equal to the first target transmission power; or if the target transmission power of the first short TTI transmission is higher than the first target transmission power, the target transmission power of the first short TTI transmission is reduced such that the reduced target transmission power of the first short TTI transmission is equal to the first target transmission power.

As can be seen from the above, in the embodiment of the present disclosure, the power control is performed on the short TTI transmissions corresponding to the to-be-processed object in the subframe, so as to ensure that the powers for the TTI transmissions within the to-be-processed object transmitted in the TDM manner are the same, thereby maintaining the transmission power of the terminal within the to-be-processed object to be constant, and avoiding introduction of a new transient period between short TTI transmissions. Hence, based on the solutions according to the embodiment of the present disclosure, the power measurement may be achieved according to the time template defined in the existing 3GPP 36.101 protocol.

In addition, on the basis of this embodiment, before step 301, the terminal may further be configured to receive configuration information for indicating a power adjustment mode. The power adjustment mode herein may refer to the first method, or the second method, or the first manner, the second manner or the third manner in the first method. Further, which mode is adopted for adjusting the power of the short TTI transmission is determined according to the configuration information in the subsequent steps. The configuration information may directly indicate that the first method or the second method is used for the terminal, or may further indicate which one of the first manner, the second manner or the third manner in the first method is used for the terminal. Alternatively, in a specific application, the terminal may determine which power adjustment mode to be used according to the predetermined or preset information. Different power adjustment methods or manners may be distinguished with different identifiers. The specific way for distinguishing the different power adjustment methods is not limited in the embodiment of the present disclosure, as long as the different power adjustment methods can be distinguished by the terminal.

Hereinafter, the implementation of the method according to the embodiments of the present disclosure will be described in detail in conjunction with the following embodiments.

Figure 4:
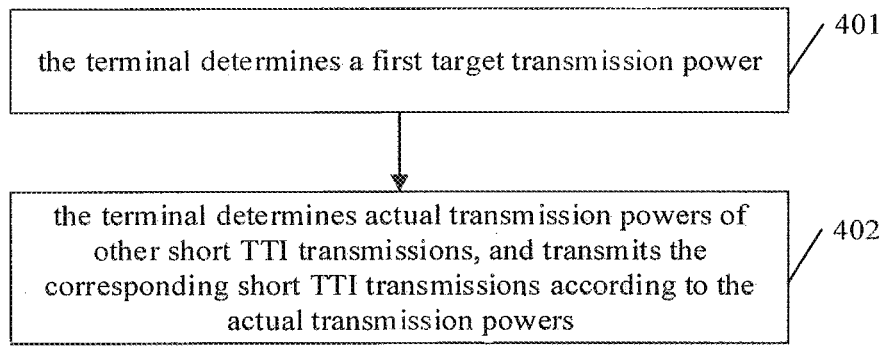
FIG. 4 is a flowchart of a power control method for short transmission time interval transmission according to another embodiment of the present disclosure.
Figure 5:
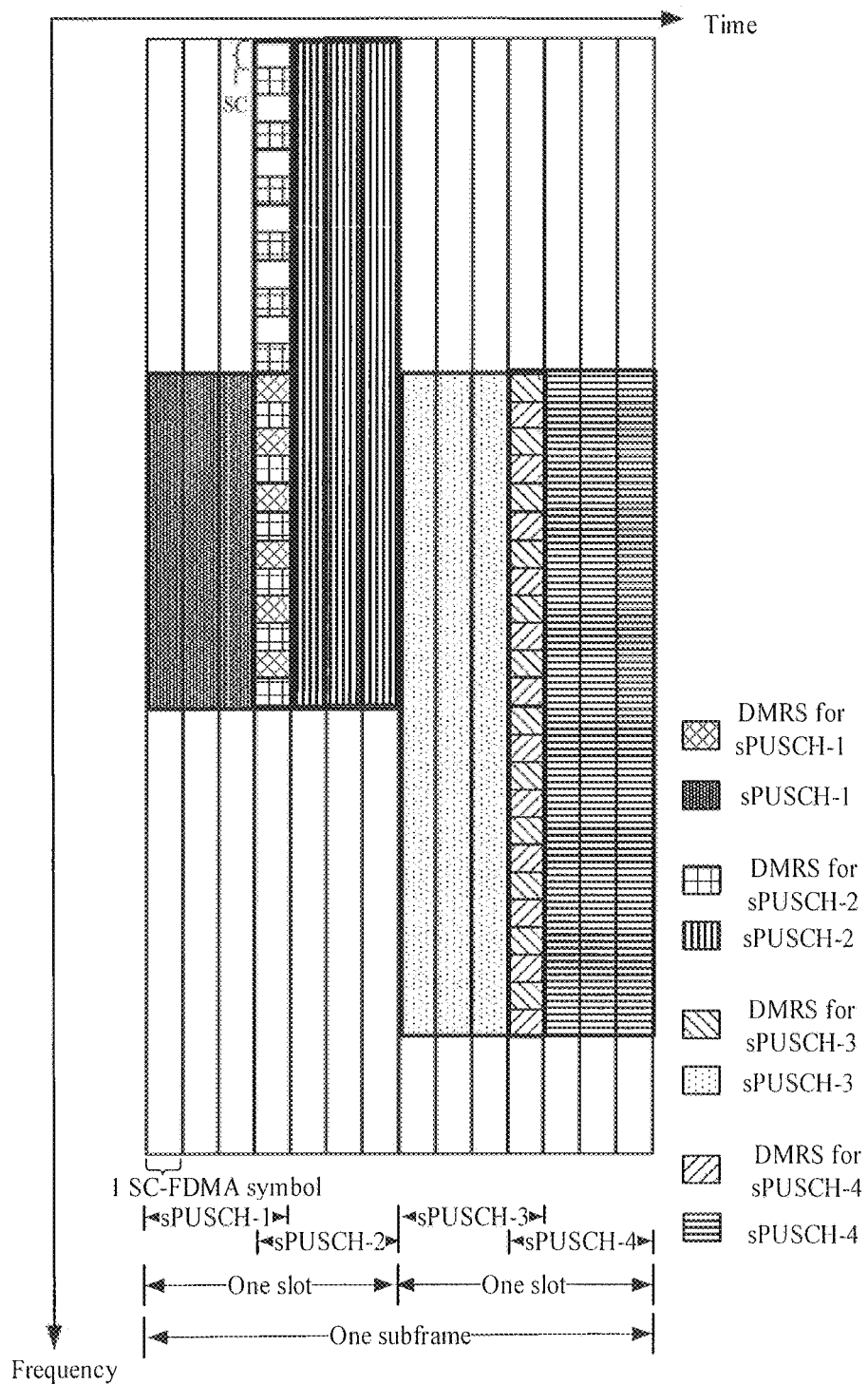
FIG. 5 is a schematic diagram of a subframe according to an embodiment of the present disclosure.

In another embodiment of the present disclosure, a short TTI transmission with a length of 4 symbols is taken as an example. In the embodiment of the present disclosure, it is assumed that the configuration information for indicating a power adjustment mode received by a terminal is to adjust the power according to the manners in the first method in the above embodiment. It is assumed that a subframe contains four short TTI transmissions, and each of the short TTI transmissions includes an sPUSCH transmission. In conjunction with FIG. 4 and FIG. 5, the specific process in this embodiment of the present disclosure includes the following steps 401 to 402.

In step 401, the terminal determines a first target transmission power.

Specifically, in this step, a target transmission power of a first sPUSCH (sPUSCH-1) is determined by the terminal to be $P_{sPUSCH-1}$ according to the power control parameter corresponding to the first sPUSCH, and the target transmission power is used as the first target transmission power.

The calculation method is shown in formula (1).

$$P_{sPUSCH,c}(i) = \min \begin{Bmatrix} P_{CMAX,c}(i), \\ 10\log_{10}(M_{sPUSCH,c}(i)) + P_{O\_sPUSCH,c}(j) + \alpha_c(j) \cdot \\ PL_c + \Delta_{TF,c}(i) + f_c(i) \end{Bmatrix} \quad (1)$$

where $P_{sPUSCH,c}$ represents the target transmission power of the sPUSCH on the carrier c, $P_{CMAX,c}(i)$ represents the maximum allowable transmission power of the terminal on the carrier c, $M_{sPUSCH,c}(i)$ represents the bandwidth allocated to the sPUSCH transmission on the carrier c, which may be specifically expressed in a value equal to the number of RBs (Resource Blocks), $P_{O\_sPUSCH,c}(j) = P_{O\_UE\_sPUSCH,c}(j) + P_{O\_NOMINAL\_sPUSCH,c}(j)$ represents a power expectation value configured at the network side, where $P_{O\_UE\_sPUSCH,c}(j)$ represents the power expectation value of a UE-specific part, $P_{O\_NOMINAL\_sPUSCH,c}(j)$ represents the power expectation value of a cell-specific part, j is related to a specific transmission condition of the sPUSCH, j=0 is used for an initial transmission/retransmission of the sPUSCH corresponding to semi-persistent scheduling, j=1 is used for the initial transmission/retransmission of the sPUSCH corresponding to dynamic scheduled grant, and j=2 is used for the initial transmission/retransmission of the sPUSCH corresponding to the RAR (Random Access Response) grant, $\alpha_c(j)$ represents a path loss compensation factor, $PL_C$ represents a path loss measurement value, $\Delta_{TF,c}(i)$ represents a power offset parameter related to a modulation coding level, and $f_c(i)$ represents a closed-loop power adjustment value determined according to a TPC (Transmit power Control) command field carried in DCI (Downlink Control Information) of the control channel for scheduling the sPUSCH transmission.

In step 402, the terminal determines actual transmission powers of other short TTI transmissions, and transmits the corresponding short TTI transmissions according to the actual transmission powers.

In this step, any of the following manners may be used by the terminal to determine the actual transmission powers of sPUSCH-2, sPUSCH-3, and sPUSCH-4.

In a first manner, the terminal directly determines that the actual transmission powers of the sPUSCH-2, sPUSCH-3, and sPUSCH-4 each is $P_{sPUSCH-1}$, and transmits the four sPUSCHs in the current subframe according to $P_{sPUSCH-1}$ as the actual transmission power.

In this case, the terminal may directly use the $P_{sPUSCH-1}$ as the actual transmission power of each subsequent sPUSCH in the subframe, rather than determining the target transmission power of the subsequent sPUSCHs according to the power control parameters corresponding to the sPUSCHs and the formula (1).

In a second manner, the terminal determines the target transmission power of the i-th sPUSCH (i=2, 3, 4) according to the power control parameter corresponding to the sPUSCH-i and the formula (1) to obtain $P_{sPUSCH-i}$. Then, the values of $P_{sPUSCH-i}$ and $P_{sPUSCH-1}$ are compared. If $P_{sPUSCH-i}$ is equal to $P_{sPUSCH-1}$, $P_{sPUSCH-i}$ is directly used as the actual transmission power of the sPUSCH-i, and no power adjustment is needed; if $P_{sPUSCH-i}$ is greater than $P_{sPUSCH-1}$, $P_{sPUSCH-i}$ is reduced to $P_{sPUSCH-1}$, and the reduced $P_{sPUSCH-i}$ is used as the actual transmission power of the sPUSCH-i; and if $P_{sPUSCH-i}$ is smaller than $P_{sPUSCH-1}$, $P_{sPUSCH-i}$ is raised to $P_{sPUSCH-1}$, and the raised $P_{sPUSCH-i}$ is used as the actual transmission power of the sPUSCH-i.

Figure 6:
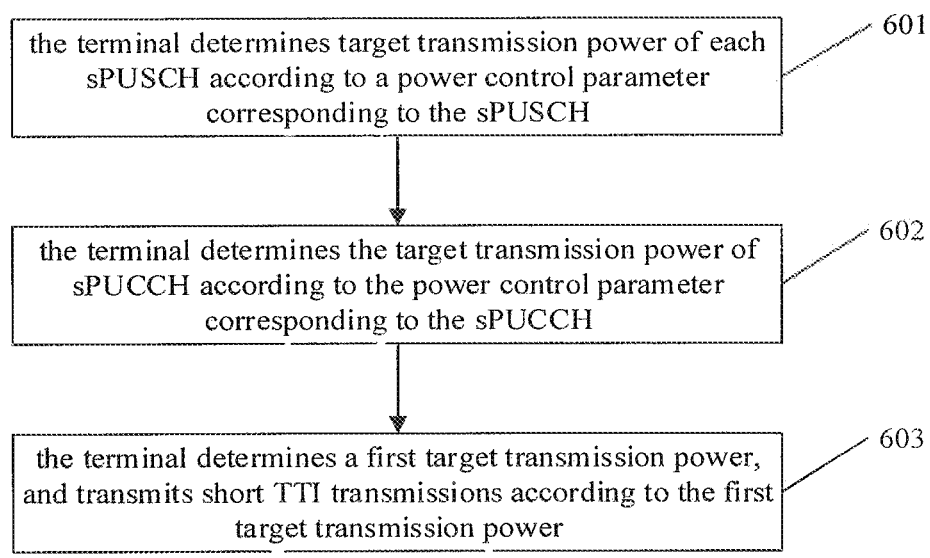
FIG. 6 is a flowchart of a power control method for a short transmission time interval transmission according to another embodiment of the present disclosure.
Figure 7:
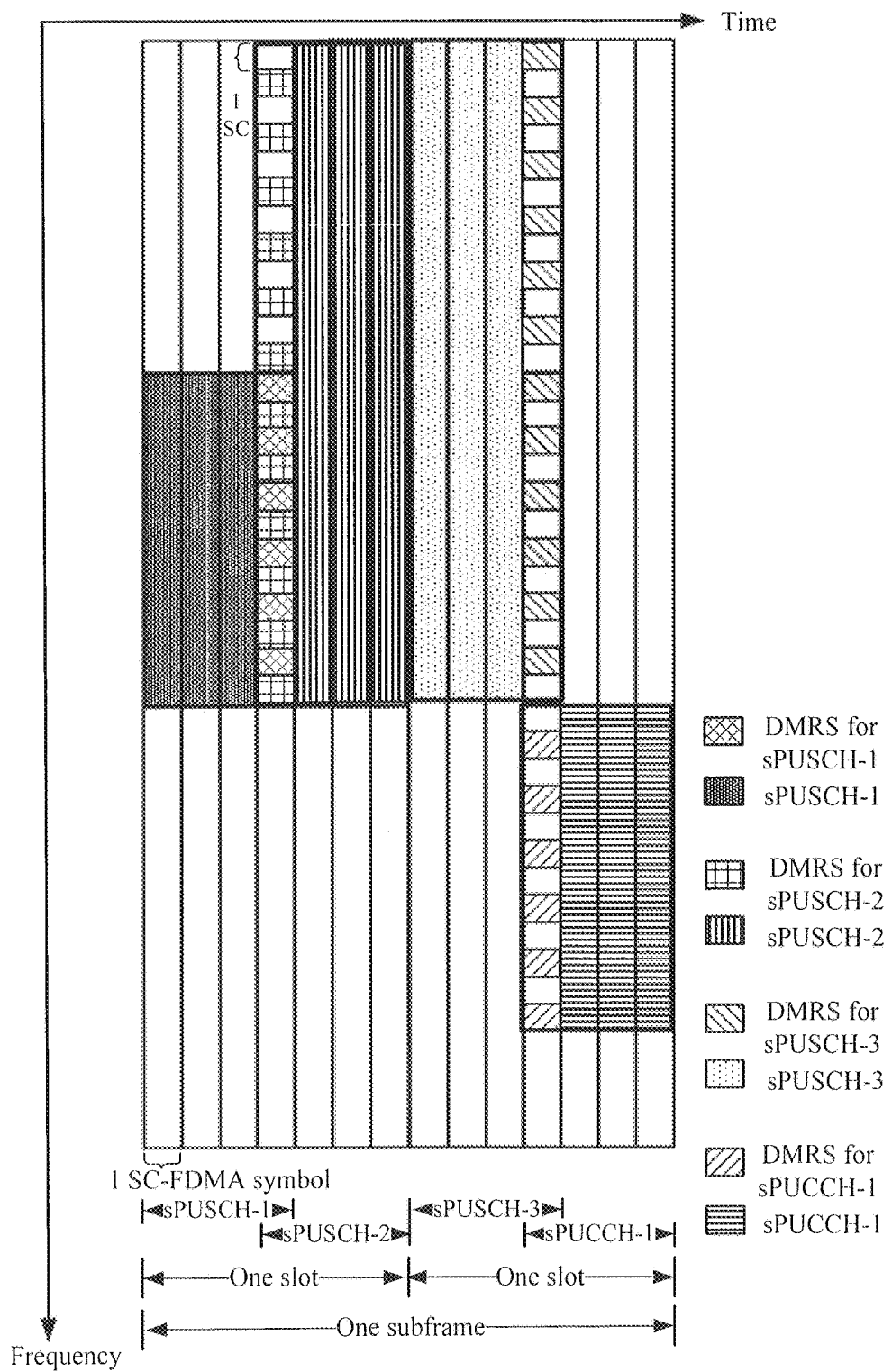
FIG. 7 is a schematic diagram of a subframe according to another embodiment of the present disclosure.

In another embodiment of the present disclosure, a short TTI transmission with a length of 4 symbols is taken as an example. In the embodiment of the present disclosure, it is assumed that the configuration information for indicating a power adjustment mode received by the terminal is to adjust the power according to the manners in the first method in the above embodiment. It is assumed that a subframe contains four short TTI transmissions, the first three short TTI transmissions each is an sPUSCH transmission, and the last short TTI transmission is an sPUCCH transmission. In conjunction with FIG. 6 and FIG. 7, the specific process in this embodiment of the present disclosure includes the following steps 601 to 603.

In step 601, the terminal determines that the target transmission powers of all sPUSCHs are $P_{sPUSCH-1}$, $P_{sPUSCH-2}$, and $P_{sPUSCH-3}$ according to the power control parameters corresponding to the sPUSCHs.

In the specific process, the target transmission power of the sPUSCHs may be determined to be $P_{sPUSCH-1}$, $P_{sPUSCH-2}$, and $P_{sPUSCH-3}$ by using the above formula (1).

In step 602, the terminal determines that the target transmission power of the sPUCCH is $P_{sPUCCH-1}$ according to the power control parameter corresponding to the sPUCCH.

Specifically, the target transmission power of the sPUCCH may be determined to be $P_{sPUCCH-1}$ by using formulas (2-1) and (2-2).

$$P_{sPUCCH}(i) = \min \begin{Bmatrix} P_{CMAX,c}(i), \\ P_{0\_sPUCCH} + PL_c + h(n_{CQI}, n_{HARQ}, n_{SR}) + \\ \Delta_{F\_sPUCCH}(F) + \Delta_{TxD}(F') + g(i) \end{Bmatrix} \quad (2\text{-}1)$$

$$P_{sPUCCH}(i) = \min \begin{Bmatrix} P_{CMAX,c}(i), \\ P_{0\_sPUCCH} + PL_c + 10\log_{10}(M_{sPUCCH,c}(i)) + \\ \Delta_{TF,c}(i) + \Delta_{F\_sPUCCH}(F) + g(i) \end{Bmatrix} \quad (2\text{-}2)$$

where $P_{sPUCCH}$ represents the target transmission power of the sPUCCH, $P_{CMAX,c}(i)$ represents the maximum allowable transmission power of the terminal on the carrier c, $M_{sPUCCH,c}(i)$ represents a transmission bandwidth allocated to the sPUCCH on the carrier c, which may be expressed in a value equal to the number of RBs, $P_{O\_sPUCCH} = P_{O\_UE\_sPUCCH} + P_{O\_NOMINAL\_sPUCCH}$ represents a power expectation value configured at the network side, where $P_{O\_UE\_sPUCCH}$ represents the power expectation value of a UE-specific part, and $P_{O\_NOMINAL\_sPUCCH}$ represents the power expectation value of a cell-specific part, $PL_c$ represents a path loss measurement value, $\Delta_{TF,c}(i)$ represents a power offset parameter related to the code rate, $h(n_{CQI}, n_{HARQ}, n_{SR})$ represents a power offset value related to the number of feedback bits of UCI carried in the sPUCCH, g(i) represents a closed loop power adjustment value determined according to a TPC command field carried in the DCI (Downlink Control Information) of the control channel corresponding to the downlink transmission for transmitting the ACK/NACK on the sPUCCH.

In step 603, the terminal determines a first target transmission power, and transmits the short TTI transmissions according to the first target transmission power.

Specifically, the first target transmission power may be determined in any one of the following manners in this step.

In a first manner, the terminal allocates a priority according to the power. For example, the power allocation priority of the sPUCCH is defined to be the highest, and then the target transmission power of the sPUCCH-1, which is the uplink channel with the highest power allocation priority, is selected as the first target transmission power.

The terminal further determines a value relationship among $P_{sPUSCH-1}$, $P_{sPUSCH-2}$, $P_{sPUSCH-3}$, and $P_{sPUCCH-1}$. If $P_{sPUSCH-i}$ is equal to $P_{sPUSCH-1}$, the $P_{sPUSCH-i}$ is directly used as the actual transmission power of sPUSCH-i, and no power adjustment is needed; if the $P_{sPUSCH-i}$ is greater than $P_{sPUSCH-1}$, $P_{sPUSCH-i}$ is reduced to $P_{sPUCCH-1}$, and the adjusted $P_{sPUSCH-i}$ is used as the actual transmission power of sPUSCH-I; and if the $P_{sPUSCH-i}$ is smaller than $P_{sPUSCH-1}$, $P_{sPUSCH-i}$ is raised to $P_{sPUCCH-1}$, and the adjusted $P_{sPUSCH-i}$ is used as the actual transmission power of sPUSCH-i, where i=1 2, 3.

In a second manner, the terminal selects the maximum value in the target transmission powers of the four channels, such as $P_{sPUSCH-2}$, as the first target transmission power. Then, the terminal further transmits each channel with a power of $P_{sPUSCH-2}$. The terminal may directly determine that the actual transmission powers of sPUSCH-1, sPUSCH-3, and sPUCCH-1 each are $P_{sPUSCH-2}$, or, the terminal may raise $P_{sPUSCH-1}$, $P_{sPUSCH-3}$, and $P_{sPUCCH-1}$ to the power value of $P_{sPUSCH-2}$, and use the raised value as the actual transmission powers of the corresponding channels.

In a third manner, the terminal selects the minimum value of the target transmission powers of the four channels, such as $P_{sPUSCH-1}$, as the first target transmission power. The terminal further transmits each channel with a power of $P_{sPUSCH-1}$. The terminal may directly determine that the actual transmission powers of sPUSCH-2, sPUSCH-3, and sPUCCH-1 each are $P_{sPUSCH-1}$, or, the terminal may reduce $P_{sPUSCH-2}$, $P_{sPUSCH-3}$, and $P_{sPUCCH-1}$ to the value of $P_{sPUSCH-1}$, and use the reduced value as the actual transmission powers of the corresponding channels.

In the fourth manner, the terminal selects an average value of the target transmission powers of the four channels as the first target transmission power, that is, $P=(P_{sPUSCH-1}+P_{sPUSCH-2}+P_{sPUSCH-3}+P_{sPUCCH-1})/4$. The terminal further transmits each channel in a power of P. The terminal may directly determine that the actual transmission powers of sPUSCH-1, sPUSCH-2, sPUSCH-3, and sPUCCH-1 each is P; or, the terminal may determine the value relationship between the target transmission power of each channel and P. If the target transmission power of the channel is equal to P, the target transmission power of the channel is directly used as the actual transmission power of the channel, and no power adjustment is needed; if the target transmission power of the channel is greater than P, the target transmission power of the channel is reduced to P as the actual transmission power of the channel. If the target transmission power of the channel is smaller than P, the target transmission power of the channel is raised to P, which is taken as the actual transmission power of the channel.

As can be seen from the above, in the embodiments of the present disclosure, the power control is performed on the short TTI transmission in the subframe, so as to ensure that the powers for the short transmissions in the subframe transmitted in a TDM manner are the same, thereby ensuring the transmission power of the terminal to be kept constant, thereby avoiding the introduction of a new transient period between short TTI transmissions. Hence, based on the solutions according to the embodiments of the present disclosure, the power measurement may be achieved according to the time template defined in the existing 3GPP 36.101 protocol.

Figure 8:
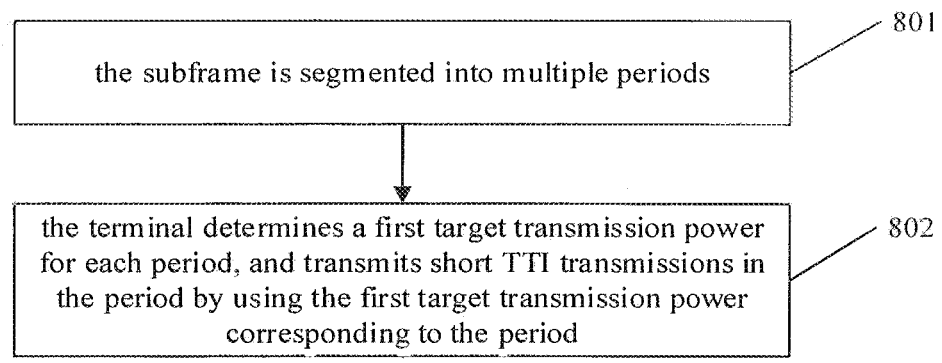
FIG. 8 is a flowchart of a power control method for a short transmission time interval transmission according to another embodiment of the present disclosure.

In another embodiment of the present disclosure, a short TTI transmission with a length of 2 symbols is taken as an example. In the embodiment of the present disclosure, it is assumed that the configuration information for indicating a power adjustment mode received by the terminal is to adjust the power according to the manners in the second method in the above embodiment. It is assumed that a subframe contains seven short TTI transmissions, one sPUSCH-1 transmission exists in only the first short TTI transmission, one sPUSCH-2 transmission and one sPUSCH-3 transmission exist in the third and fourth short TTI transmissions respectively, and one sPUCCH-1 transmission exists in the last short TTI transmission. In conjunction with FIG. 8 and FIG. 9, the specific process in this embodiment of the present disclosure includes the following steps 801 and 802.

In step 801, the subframe is segmented into multiple periods according to whether the short TTI transmissions in the subframe are continuous in time.

Figure 9:
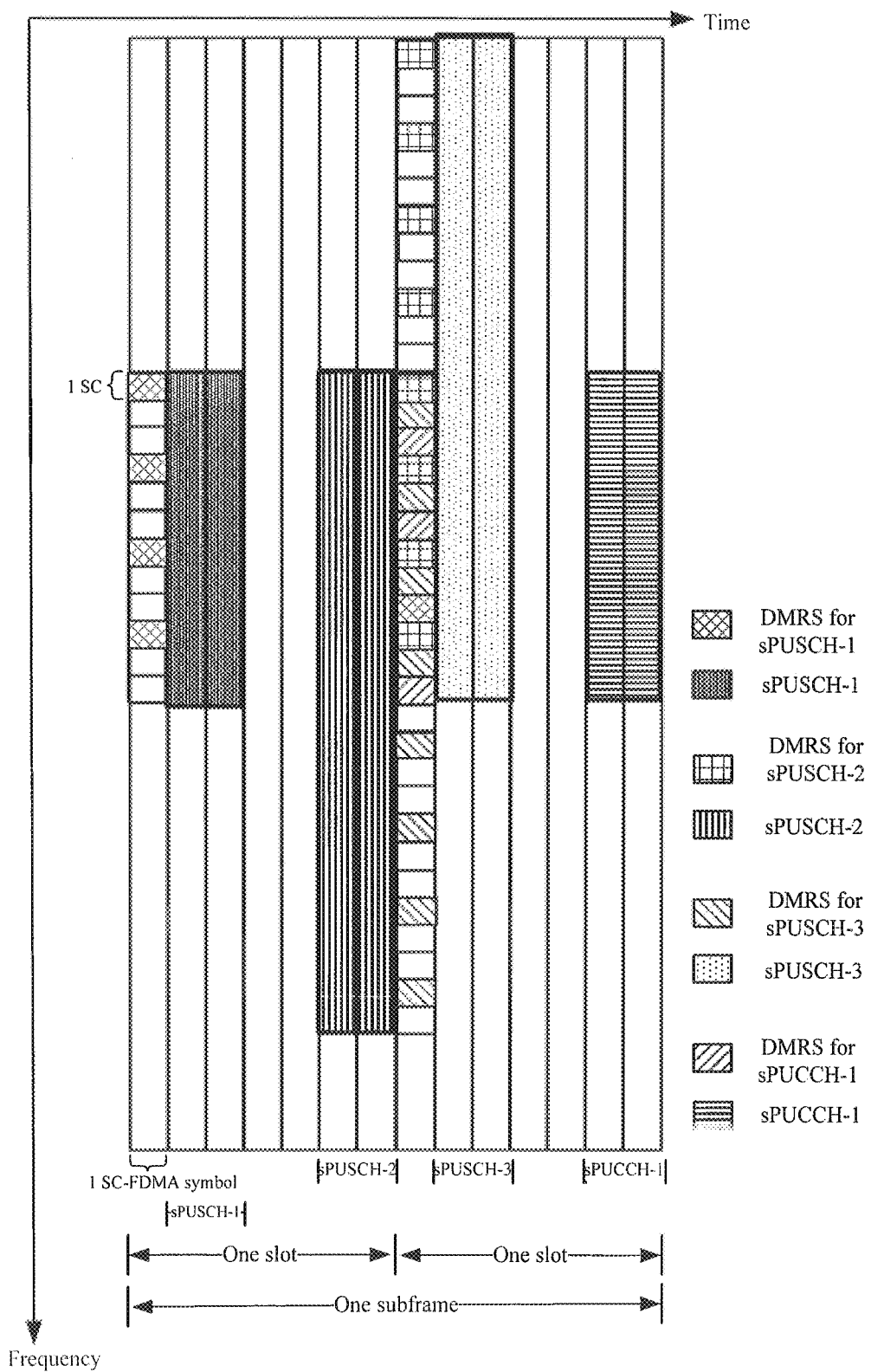
FIG. 9 is a schematic diagram of a subframe according to another embodiment of the present disclosure.

As shown in FIG. 9, the terminal determines that both sPUSCH-1 and sPUCCH-1 are in channels where there is no adjacent short TTI channel transmission in one subframe. Idle SC-FDMA symbols exist after sPUSCH-1 and before sPUCCH-1, which may be used as a transient period for the power adjustment of a RF (Radio Frequency) device. Therefore, the independent power control is performed on the two channels without considering the powers of other channels. The terminal segments sPUSCH-2 and sPUSCH-3 into one period.

In step 802, the terminal determines a first target transmission power for each period, and transmits short TTI transmissions in the period by using the first target transmission power corresponding to the period.

The target transmission power of the sPUSCH-1 is determined to be $P_{sPUSCH-1}$ according to the formula (1) and the power control parameter corresponding to the sPUSCH, the target transmission power is used as the actual transmission power of the sPUSCH-1, namely, the first target transmission power of the sPUSCH-1, and the sPUSCH-1 is transmitted according to the actual transmission power.

The target transmission power of the sPUCCH-1 is determined to be $P_{sPUCCH-1}$ according to the power control parameter corresponding to the sPUCCH and the formula (2-1) or (2-2), the target transmission power is used as the actual transmission power of the sPUCCH-1, namely, the first target transmission power of the sPUCCH-1, and the sPUCCH-1 is transmitted according to the actual transmission power.

The terminal divides sPUSCH-2 and sPUSCH-3 into one period, the two channels are adjacent to each other in the period, and there is no idle SC-FDMA symbol between the channels, which is used as a transient period for the power adjustment of the RF device. Hence, there is a need to ensure that the transmission powers of the two short TTI transmission channels are the same.

Specifically, regarding how to determine the first target transmission power in this period, reference may be made to any one of the manners in the first method in the above embodiments.

For example, the target transmission power of sPUSCH-2 is determined to be $P_{sPUSCH-2}$ according to formula (1) and the power control parameter corresponding to sPUSCH-2, and the target transmission power is used as the actual transmission power of sPUSCH-2 and sPUSCH-3, namely, the first target transmission power of this period, and sPUSCH-2 and sPUSCH-3 are transmitted according to the actual transmission power.

As can be seen from the above, in the embodiments of the present disclosure, the power control is performed on the short TTI transmission in each of the periods, so as to ensure the powers for the short TTI transmissions transmitted in the TDM manner to be the same in each of the periods, thereby ensuring the transmission power of the terminal to be kept constant, thereby avoiding the introduction of a new transient period between the short TTI transmissions. Hence, based on the solutions according to the embodiments of the present disclosure, the power measurement may be achieved according to the time template defined in the existing 3GPP 36.101 protocol.

It should be noted that, in the above embodiments, only the short TTI transmission with 4 symbols and the short TTI transmission with 2 symbols are taken as examples, and short TTI transmissions with other symbol lengths is similar. Short TTI transmissions on symbols with different lengths may exist in the subframe in a TDM manner. For example, the first short TTI transmission has a length of 2 symbols, the second short TTI transmission has a length of 4 symbols, and the third short TTI transmission has a length of 7 symbols. The power control process is similar to the above-described power control process.

It should be noted that, in the embodiment of the present disclosure, only a plurality of short TTI transmissions sharing pilots in a column (DMRS, Demodulation Reference Signal) in a comb mode is used as a DMRS design for the uplink transmission, and other DMRS design for uplink transmission has no effect on the power control scheme of the present disclosure. For the above embodiment, the implementation of the definition of other power allocation priorities, such as the UCI, is similar to the implementation of the definition of the channel priority, which is not repeated any more.

It should be noted that the maintaining the transmission power in a subframe to be constant described above involves transmission power of the data symbol and transmission power of the pilot symbol.

If pilots are transmitted in the comb mode in the embodiment of the present disclosure, a plurality of short TTI transmissions of the pilots are transmitted in the comb mode on one SC-FDMA symbol, and a total power of the pilots for the plurality of short TTI transmissions on the SC-FDMA symbol is the same as that on the data symbol. That is, if the transmission power of the pilot corresponding to each of the short TTI transmissions on each RE (Resource Element) on the SC-FDMA symbol is the same as the transmission power of data of the short TTI transmission on the RE, $P_{dataRE}=P/B$, (where P represents the total transmission power of the data on one SC-FDMA symbol, and B represents the number of REs occupied by the data in the SC-FDMA symbol), the sum of powers of the pilots for the short TTI transmissions on the SC-FDMA symbol is expressed as $P_{dataRE}*B/A=P/A$, where A represents the number of combs (that is, how many DMRSs (Demodulation Reference Signals) of the short TTI transmissions may be supported in one RB (Resource Block) or twelve REs to share one SC-FDMA symbol resource at different positions in the frequency domain and with the same mapping interval in the frequency domain). That is, the sum of powers of the pilots for the short TTI transmissions on an SC-FDMA symbol is equal to 1/A of the total power of data on an SC-FDMA symbol, and the sum of powers of A DMRSs of the short TTI transmissions with the same transmission power on the SC-FDMA symbol is expressed as $A*1/A*P=P$. In a case that no data is transmitted in some of the short TTI transmissions sharing one SC-FDMA symbol for transmitting DMRSs, the transmission power of the DMRSs carried on the SC-FDMA symbol is lower than the transmission power of the data on an SC-FDMA symbol. In this case, the transmission powers of DMRSs for the short TTI transmissions in which data transmission exists are increased to ensure the transmission power of the DMRSs carried on the SC-FDMA symbol to be equal to the transmission power of the data on the SC-FDMA symbol.

If the DMRS is shared in a non-comb mode, for example, DMRSs of a plurality of short TTI transmissions are transmitted on one SC-FDMA symbol in a code division multiplexing (CDM) manner, the power of DMRS for each of the plurality of short TTI transmissions needs to be reduced. For example, the power of DMRS is reduced to 1/C of the data transmission power P, and C represents the number of short TTI transmissions that share the pilot transmission on one SC-FDMA symbol by means of CDM, ensuring that the sum of the powers of the pilots for the plurality of short TTI transmissions on one SC-FDMA symbol is the same as the transmission power of the data.

Figure 10:
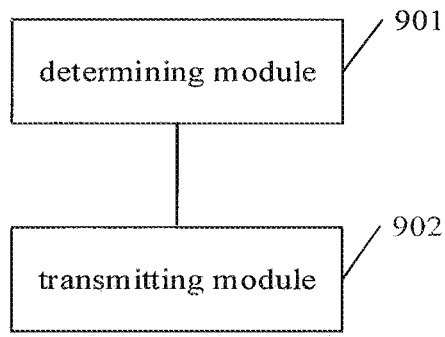
FIG. 10 is a schematic diagram of a power control apparatus for a short transmission time interval transmission according to an embodiment of the present disclosure.

As shown in FIG. 10, a power control apparatus for a short transmission time interval transmission is further provided according to an embodiment of the present disclosure, which includes:

a determining module 901, configured to determine a first target transmission power corresponding to a to-be-processed object in a subframe, in a case that the subframe includes a plurality of short TTI transmissions; and a transmitting module 902, configured to transmit the short TTI transmissions within the to-be-processed object according to the first target transmission power corresponding to the to-be-processed object.

The meaning of the to-be-processed object is the same as that described in the above embodiments. As described above, there are three manners for determining the first target transmission power.

The determining module 901 includes:

a first determining sub-module, configured to determine a target transmission power of a first one of the short TTI transmissions within the to-be-processed object; and a second determining sub-module, configured to determine the target transmission power of the first short TTI transmission within the to-be-processed object to be the first target transmission power corresponding to the to-be-processed object.

The determining module 901 includes:

a third determining sub-module, configured to determine target transmission powers of all the short TTI transmissions within the to-be-processed object; and a fourth determining sub-module, configured to determine a maximum value, a minimum value or an average value of the target transmission powers of all the short TTI transmissions within the to-be-processed object to be the first target transmission power corresponding to the to-be-processed object.

The determining module 901 is specifically configured to:

determine the first target transmission power corresponding to the to-be-processed object according to a power allocation priority of each of the short TTI transmissions within the to-be-processed object.

The power allocation priority includes any one or combination of a channel priority, an uplink control information UCI type priority, and a service type priority. In this case, the determining module 901 is specifically configured to: take a target transmission power of the short TTI transmission with the highest or lowest power allocation priority within the to-be-processed object as the first target transmission power corresponding to the to-be-processed object.

In this case, if there is a plurality of short TTI transmissions with the same power allocation priority, the determining module 901 is specifically configured to: take the maximum one of the target transmission powers of the short TTI transmission with the highest or lowest power allocation priority within the to-be-processed object as the first target transmission power corresponding to the to-be-processed object.

In the embodiments of the present disclosure, the power allocation priority may be defined as follows.

In a case that the power allocation priority is the channel priority, a priority of a shortened physical uplink shared channel (sPUSCH) is higher than a priority of a shortened physical uplink control channel (sPUCCH); or the priority of the sPUCCH is higher than the priority of the sPUSCH; or a priority of a channel with a wide bandwidth is higher than a priority of a channel with a narrow bandwidth.

In a case that the power allocation priority is the UCI type priority, a priority of a channel with UCI is higher than a priority of a channel without UCI; and among the channels with the UCI, a priority of a channel with an uplink scheduling request (SR) and/or a positive acknowledgment/negative acknowledgment (ACK/NACK) is higher than a priority of a channel with periodic channel state information (CSI).

In a case that the power allocation priority is the service type priority, a service type with a high quality of service (Qos) or a service type with a high delay requirement has a high priority.

In a case that the power allocation priority is a combination of the channel priority and the UCI type priority, a priority of an sPUSCH with the UCI is higher than a priority of an sPUSCH, and the priority of the sPUCCH is higher than a priority of an sPUSCH without the UCI; and a priority of an sPUSCH with SR and/or ACK/NACK is higher than a priority of an sPUSCH with periodic CSI, and a priority of an sPUCCH with the SR and/or the ACK/NACK is higher than a priority of an sPUCCH with the periodic CSI. Alternatively, the priority of the sPUSCH with the UCI is higher than the priority of the sPUSCH without the UCI, and the priority of the sPUSCH without the UCI is higher than the priority of the sPUCCH; and the priority of the sPUSCH with the SR and/or the ACK/NACK is higher than the priority of the sPUSCH with the periodic CSI, and the priority of the sPUCCH with the SR and/or the ACK/NACK is higher than the priority of the sPUCCH with the periodic CSI.

In the embodiments of the present disclosure, the target transmission power is a transmission power determined according to a power control parameter corresponding to the corresponding short TTI transmission. If at least one of the short TTI transmissions overlap or partially overlap with each other in the time domain, the target transmission power is a target transmission power obtained by adjusting target transmission powers of the at least one short TTI transmissions overlapping in the time domain based on the maximum transmission power of a terminal; or, if a plurality of short TTI transmissions are transmitted in a frequency division multiplexing manner on a same carrier or on different carriers in the frequency domain, the target transmission power is a target transmission power of one of the short TTI transmissions selected according to at least one of the channel priority or the service type priority.

Optionally, the transmitting module 902 is specifically configured to: transmitting all of the short TTI transmissions within the to-be-processed object directly according to the first target transmission power.

Optionally, the transmitting module 902 includes: a fifth determining sub-module, configured to determine a target transmission power of each of the short TTI transmissions within the to-be-processed object; a comparing sub-module, configured to compare the target transmission power of each of the short TTI transmissions with the first target transmission power; an adjusting sub-module, configured to adjust a target transmission power of a first short TTI transmission to enable the adjusted target transmission power of the first short TTI transmission to be equal to the first target transmission power, if the target transmission power of the first short TTI transmission is different from the first target transmission power where the first short TTI transmissions is any one of the short TTI transmissions; and a transmitting sub-module, configured to transmit the first short TTI transmission according to the adjusted target transmission power of the first short TTI transmission.

Specifically, the adjusting sub-module is specifically configured to: if the target transmission power of the first short TTI transmission is lower than the first target transmission power, raise the target transmission power of the first short TTI transmission such that the raised target transmission power of the first short TTI transmission is equal to the first target transmission power; or if the target transmission power of the first short TTI transmission is higher than the first target transmission power, reduce the target transmission power of the first short TTI transmission such that the reduced target transmission power of the first short TTI transmission is equal to the first target transmission power.

Figure 11:
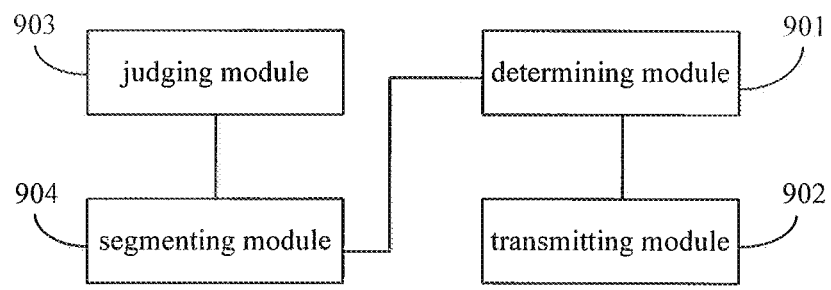
FIG. 11 is a structural diagram of a power control apparatus for a short transmission time interval transmission according to another embodiment of the present disclosure.

The to-be-processed object is any one of periods in the subframe. As shown in FIG. 11, the apparatus further includes: a judging module 903, configured to judge whether the plurality of short TTI transmissions included in the subframe is continuous in time; and a segmenting module 904, configured to, if some or all of the short TTI transmissions that are discontinuous in time exist in the subframe, segment the subframe into at least two periods. Each of the periods includes one or more short TTI transmissions, and when the period includes more than one short TTI transmissions, the more than one short TTI transmissions included in the period are continuous in time.

Figure 12:
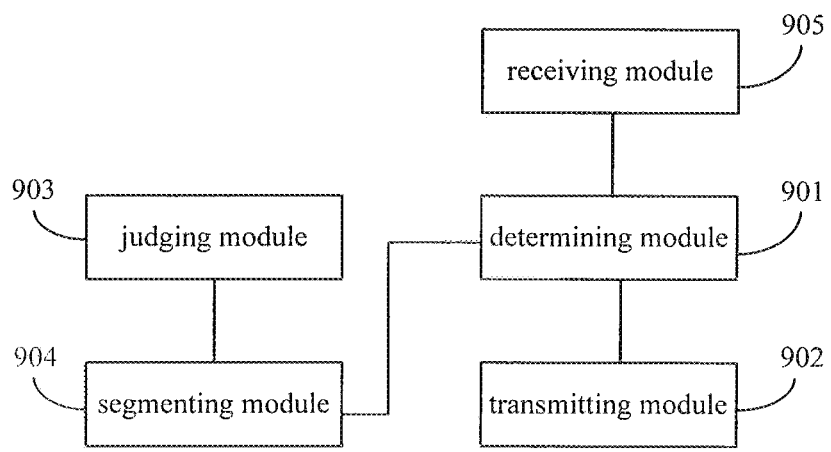
FIG. 12 is a structural diagram of a power control apparatus for a short transmission time interval transmission according to another embodiment embodiment of the present disclosure.

As shown in FIG. 12, the apparatus further includes: a receiving module 905, configured to receive configuration information for indicating a power adjustment mode; the determining module 901 is specifically configured to: determine the first target transmission power corresponding to the to-be-processed object according to the configuration information for indicating a power adjustment mode.

In the embodiments of the present disclosure, each of the short TTI transmissions includes: an sPUSCH, and/or an sPUCCH and/or a sounding reference signal (SRS).

For the operating principle of the apparatus according to the present disclosure, reference may be made to the description of the foregoing method embodiments, and the apparatus may be arranged in the terminal.

As can be seen from the above, in the embodiments of the present disclosure, the power control is performed on the short TTI transmission corresponding to the to-be-processed object in the subframe, so as to ensure that the powers for the short TTI transmissions in the TDM manner within the to-be-processed object are the same, thereby ensuring the transmission power of the terminal within the to-be-processed object to be kept constant, thereby avoiding the introduction of a new transient period between short TTI transmissions. Hence, with the solutions according to the embodiments of the present disclosure, the power measurement may be achieved according to the time template defined in the existing 3GPP 36.101 protocol.

A data processing apparatus is provided according to an embodiment of the present disclosure, which includes: a processor; and a memory connected to the processor via a bus interface. The memory is configured to store programs and data used by the processor when performing operations. When calling and executing the programs and data stored in the memory, the processor includes the following functional modules or units:

a determining module, configured to determine a first target transmission power corresponding to a to-be-processed object in a subframe, in a case that the subframe includes a plurality of short TTI transmissions; and a transmitting module, configured to transmit the short TTI transmission within the to-be-processed object according to the first target transmission power corresponding to the to-be-processed object.

It should be noted that the apparatus according to the embodiment of the present disclosure is an apparatus capable of implementing the power control method for a short transmission time interval transmission according to the foregoing method embodiments, and therefore all embodiments about the power control method for a short transmission time interval transmission according to the foregoing method embodiments may be applicable to this embodiment, with the same or similar benefits being achieved.

It should be understood that, in the embodiments according to the present application, the disclosed method and apparatus may be implemented in other manners. The above-mentioned embodiments of the apparatus according to the present disclosure are only illustrative. For example, the division in units is only a logical division of functions and other kinds of division are possible in practice. For example, multiple units or components may be combined together or may be integrated in another system; or some features may be omitted or not implemented. Furthermore, the coupling, directly coupling or communication connection between the components shown or discussed may be indirectly coupling or communication connection between apparatuses or units via some interfaces and may be electrical, mechanical or in other form.

Furthermore, the functional units in the embodiments of the present disclosure may be all integrated in a processing unit; the functional units may be each operates as a physical unit; or two or more of the functional units may be integrated in a unit. The integrated unit may be implemented in the form of hardware or in the form of hardware and software.

The above integrated unit which is implemented in the form of the software function units may be stored in a computer readable storage medium. The software function units are stored in a storage medium and include multiple instructions for instructing a computer device (which may be a personal computer, a server, a network equipment or the like) to perform all or part of the methods described in the embodiments of the present disclosure. The storage medium may include any medium which is capable of storing program codes, such as a U disk, a removable hard disk, a read-only memory (ROM), a random access memory (RAM), a magnetic disk or an optical disk.

The above embodiments are preferred embodiments of the present disclosure. It should be noted that numerous improvements and modifications may be made by those skilled in the art without departing from the principle of the present disclosure, and these improvements and modifications shall also fall within the scope of the present disclosure.

What is claimed is:

1. A power control method for a short transmission time interval transmission, comprising:
   determining one first target transmission power corresponding to a to-be-processed object in a subframe, in a case that the subframe comprises a plurality of short transmission time interval (TTI) transmissions, wherein the to-be-processed object comprises a plurality of short TTI transmissions, and each of the plurality of short TTI transmissions has a duration of shorter than 1 ms; and
   transmitting all of the plurality of short TTI transmissions within the to-be-processed object at the one first target transmission power corresponding to the to-be-processed object, wherein all the plurality of short TTI transmissions in the subframe are transmitted in a Time Division Multiplexing (TDM) manner,
   wherein the determining the one first target transmission power corresponding to the to-be-processed object in the subframe comprises one of following three manners:
   a first manner, determining a target transmission power of a first one of the short TTI transmissions within the to-be-processed object; and determining the target transmission power of the first short TTI transmission within the to-be-processed object as the first target transmission power corresponding to the to-be-processed object; or
   a second manner, determining target transmission powers of all the short TTI transmissions within the to-be-processed object; and
   determining a maximum value, a minimum value, or an average value of the target transmission powers of all the short TTI transmissions within the to-be-processed object as the first target transmission power corresponding to the to-be-processed object; or
   a third manner, determining the first target transmission power corresponding to the to-be-processed object a power allocation priority of each of the short TTI transmissions within the to-be-processed object,
   wherein the transmitting all of the plurality of short TTI transmissions within the to-be-processed object at the one first target transmission power corresponding to the to-be-processed object comprises:
   determining a target transmission power of each of the short TTI transmissions within the to-be-processed object;
   comparing the target transmission power of each of the short TTI transmissions with the first target transmission power;
   adjusting a target transmission power of a first short TTI transmission to be equal to the first target transmission power, when the target transmission power of the first short TTI transmission is different from the first target transmission power wherein the first short TTI transmission is any one of the short TTI transmissions.

2. The method according to claim 1, wherein the power allocation priority comprises any one or combination of a channel priority, an uplink control information (UCI) type priority, and a service type priority; and/or
   wherein the determining the first target transmission power corresponding to the to-be-processed object according to the power allocation priority of each of the short TTI transmissions within the to-be-processed object comprises:
   taking a target transmission power of a short TTI transmission having the highest or lowest power allocation priority within the to-be-processed object as the first target transmission power corresponding to the to-be-processed object.

3. The method according to claim 2, wherein in a case that there is a plurality of short TTI transmissions having a same power allocation priority, the taking the target transmission power of the short TTI transmission having the highest or lowest power allocation priority within the to-be-processed object as the first target transmission power corresponding to the to-be-processed object comprises:
   taking the maximum one of the target transmission powers of the short TTI transmissions having the highest or lowest power allocation priority as the first target transmission power corresponding to the to-be-processed object.

4. The method according to claim 2, wherein in a case that the power allocation priority is the channel priority, the method further comprises:
   defining a priority of a shortened physical uplink shared channel (sPUSCH) to be higher than a priority of a shortened physical uplink control channel (sPUCCH); or defining the priority of the sPUCCH to be higher than the priority of the sPUSCH; or defining a priority of a channel with a wide bandwidth to be higher than a priority of a channel with a narrow bandwidth; or
   wherein in a case that the power allocation priority is the UCI type priority, the method further comprises:
   defining a priority of a channel with UCI to be higher than a priority of a channel without UCI; wherein among the channels with UCI, a priority of a channel with an uplink scheduling request (SR) and/or an acknowledgment/negative acknowledgment (ACK/NACK) is higher than a priority of a channel with periodic channel state information (CSI); or
   wherein in a case that the power allocation priority is the service type priority, the method further comprises:
   defining a high priority for a service type with a high quality of service (Qos) or a service type with a critical delay requirement; or
   wherein in a case that the power allocation priority is the combination of the channel priority and the UCI type priority, the method further comprises:
   defining that a priority of an sPUSCH with UCI is higher than a priority of an sPUCCH, and that the priority of the sPUCCH is higher than a priority of an sPUSCH without UCI; and defining that a priority of an sPUSCH with SR and/or ACK/NACK is higher than a priority of an sPUSCH with CSI, and that a priority of an sPUCCH with SR and/or the ACK/NACK is higher than a priority of an sPUCCH with periodic CSI; or
   defining that the priority of the sPUSCH with UCI is higher than the priority of the sPUSCH without UCI, and that the priority of the sPUSCH without UCI is higher than the priority of the sPUCCH; and defining that the priority of the sPUSCH with SR and/or the ACK/NACK is higher than the priority of the sPUSCH with periodic CSI, and that the priority of the sPUCCH with SR and/or the ACK/NACK is higher than the priority of the sPUCCH with periodic CSI.

5. The method according to claim 1, wherein the target transmission power is determined according to a power control parameter corresponding to the corresponding short TTI transmission; and
   wherein when a plurality of short TTI transmissions overlap or partially overlap with each other in a time domain, the target transmission power is obtained by adjusting the target transmission powers of the plurality of short TTI transmissions overlapping in the time domain based on a maximum transmission power of a terminal; or,
   when a plurality of short TTI transmissions are transmitted in a frequency division multiplexing manner on a same carrier or on different carriers in a frequency domain, the target transmission power is a target transmission power of one of the short TTI transmissions selected according to at least one of the channel priority or the service type priority.

6. The method according to claim 1,
   wherein the adjusting the target transmission power of the first short TTI transmission comprises:
   when the target transmission power of the first short TTI transmission is lower than the first target transmission power, raising the target transmission power of the first short TTI transmission to be equal to the first target transmission power; or
   when the target transmission power of the first short TTI transmission is higher than the first target transmission power, reducing the target transmission power of the first short TTI transmission to be equal to the first target transmission power.

7. The method according to claim 1, wherein the to-be-processed object in the subframe is the subframe; or
   wherein the to-be-processed object in the subframe is any one of periods in the subframe; and before determining the one first target transmission power corresponding to the to-be-processed object in a subframe, the method further comprises:
   determining whether the plurality of short TTI transmissions comprised in the subframe is continuous in time; and
   when there are short TTI transmissions that are discontinuous in time in the subframe, segmenting the subframe into at least two periods, wherein each of the periods comprises one or more short TTI transmissions, and when the period comprises more than one short TTI transmissions, the more than one short TTI transmissions comprised in the period are continuous in time.

8. The method according to claim 1, wherein before determining the one first target transmission power corresponding to the to-be-processed object, the method further comprises:
   receiving configuration information for indicating a power adjustment mode; and
   wherein the determining the one first target transmission power corresponding to the to-be-processed object further comprises:
   determining the first target transmission power corresponding to the to-be-processed object according to the configuration information for indicating the power adjustment mode.

9. The method according to claim 1, wherein each of the short TTI transmissions comprises any one or any combination of: an sPUSCH, an sPUCCH, and a sounding reference signal (SRS).

10. A power control apparatus for a short transmission time interval transmission, comprising:
a processor;
a memory, configured to store programs and data used by the processor in performing operations; and
a transceiver, configured to receive and transmit the data under control of the processor, wherein all the plurality of short TTI transmissions in the subframe are transmitted in a Time Division Multiplexing (TDM) manner,
wherein when calling and executing the programs and data stored in the memory, the processor is configured to:
determine one first target transmission power corresponding to a to-be-processed object in a subframe, in a case that the subframe comprises a plurality of short TTI transmissions, wherein the to-be-processed object comprises a plurality of short TTI transmissions, and each of the plurality of short TTI transmissions has a duration of shorter than 1 ms; and
transmit all of the plurality of short TTI transmissions in the to-be-processed object at the one first target transmission power corresponding to the to-be-processed object,
wherein in determining the one first target transmission power corresponding to the to-be-processed object in the subframe, the processor is configured to perform at least one of the following manners:
a first manner, determining a target transmission power of a first one of the short TTI transmissions within the to-be-processed object; and determining the target transmission power of the first short TTI transmission within the to-be-processed object as the first target transmission power corresponding to the to-be-processed object; or
a second manner, determining target transmission powers of all the short TTI transmissions within the to-be-processed object; and determining a maximum value, a minimum value, or an average value of the target transmission powers of all the short TTI transmissions within the to-be-processed object as the first target transmission power corresponding to the to-be-processed object; or
a third manner, determining the first target transmission power corresponding to the to-be-processed object according to a power allocation priority of each of the short TTI transmissions within the to-be-processed object,
wherein the processor is specifically configured to determine a target transmission power of each of the short TTI transmissions within the to-be-processed object;
compare the target transmission power of each of the short TTI transmissions with the first target transmission power;
adjust a target transmission power of a first short TTI transmission to be equal to the first target transmission power, when the target transmission power of the first short TTI transmission is different from the first target transmission power wherein the first short TTI transmissions is any one of the short TTI transmissions; and
transmit the first short TTI transmission at the adjusted target transmission power of the first short TTI transmission.

11. The apparatus according to claim 10, wherein the power allocation priority comprises any one or combination of a channel priority, an uplink control information UCI type priority, and a service type priority; and/or in determining the first target transmission power corresponding to the to-be-processed object according to the power allocation priority of each of the short TTI transmissions in the to-be-processed object,
the processor is specifically configured to:
take a target transmission power of the short TTI transmission having the highest or lowest power allocation priority within the to-be-processed object as the first target transmission power corresponding to the to-be-processed object.

12. The apparatus according to claim 11, wherein in a case that there is a plurality of short TTI transmissions having a same power allocation priority, the processor is specifically configured to: take the maximum one of the target transmission powers of the short TTI transmissions having the highest or lowest power allocation priority as the first target transmission power corresponding to the to-be-processed object.

13. The apparatus according to claim 11, wherein in a case that the power allocation priority is the channel priority,
a priority of a shortened physical uplink shared channel (sPUSCH) is higher than a priority of a shortened physical uplink control channel (sPUCCH); or the priority of the sPUCCH is higher than the priority of the sPUSCH; or a priority of a channel with a wide bandwidth is higher than a priority of a channel with a narrow bandwidth; or
wherein in a case that the power allocation priority is the UCI type priority,
a priority of a channel with UCI is higher than a priority of a channel without UCI; and among the channels with the UCI, a priority of a channel with an uplink scheduling request (SR) and/or an acknowledgment/negative acknowledgment (ACK/NACK) is higher than a priority of a channel with periodic channel state information (CSI); or
wherein in a case that the power allocation priority is the service type priority, a service type with a high quality of service (Qos) or a service type with a critical delay requirement has a high priority; or
wherein in a case that the power allocation priority is the combination of the channel priority and the UCI type priority,
a priority of an sPUSCH with UCI is higher than a priority of an sPUSCH, and the priority of the sPUCCH is higher than a priority of an sPUSCH without the UCI; and a priority of an sPUSCH with SR and/or ACK/NACK is higher than a priority of an sPUSCH with periodic CSI, and a priority of an sPUCCH with the SR and/or the ACK/NACK is higher than a priority of an sPUCCH with the periodic CSI; or
the priority of the sPUSCH with the UCI is higher than the priority of the sPUSCH without UCI, and the priority of the sPUSCH without the UCI is higher than the priority of the sPUCCH; and the priority of the sPUSCH with the SR and/or the ACK/NACK is higher than the priority of the sPUSCH with the periodic CSI, and the priority of the sPUCCH with the SR and/or the ACK/NACK is higher than the priority of the sPUCCH with the periodic CSI.

14. The apparatus according to claim 10, wherein the target transmission power is determined according to a power control parameter corresponding to the corresponding short TTI transmission; and
wherein when a plurality of short TTI transmissions overlap or partially overlap with each other in a time domain, the target transmission power is obtained by adjusting the target transmission powers of the plurality of short TTI transmissions overlapping in the time domain based on the maximum transmission power of a terminal; or, when a plurality of short TTI transmissions are transmitted in a frequency division multiplexing manner on a same carrier or on different carriers in a frequency domain, the target transmission power is a target transmission power of one of the short TTI transmissions selected according to at least one of the channel priority or the service type priority.

15. The apparatus according to claim 10,
wherein in adjusting the target transmission power of the first short TTI transmission, the processor is specifically configured to:
when the target transmission power of the first short TTI transmission is lower than the first target transmission power, raise the target transmission power of the first short TTI transmission to be equal to the first target transmission power; or
when the target transmission power of the first short TTI transmission is higher than the first target transmission power, reduce the target transmission power of the first short TTI transmission to be equal to the first target transmission power.

16. The apparatus according to claim 10, wherein the to-be-processed object in the subframe is the subframe; or the to-be-processed object in the subframe is any one of periods in the subframe; and the processor is further configured to:
judge whether the plurality of short TTI transmissions comprised in the subframe is continuous in time; and
when there are the short TTI transmissions that are discontinuous in time in the subframe, segment the subframe into at least two periods, wherein each of the periods comprises one or more short TTI transmissions, and when the period comprises more than one short TTI transmissions, the more than one short TTI transmissions comprised in the period are continuous in time.

17. The apparatus according to claim 10, wherein the processor is configured to:
receive configuration information for indicating a power adjustment mode; and
wherein the processor is specifically configured to: determine the first target transmission power corresponding to the to-be-processed object according to the configuration information for indicating the power adjustment mode.

18. The apparatus according to claim 10, wherein each of the short TTI transmissions comprises any one of: an sPUSCH, an sPUCCH, and a sounding reference signal (SRS), or any combination thereof.

* * * * *